United States Patent
Katsuragi (10) Patent No.: US 7,180,613 B2
(45) Date of Patent: Feb. 20, 2007

(54) IMAGE FORMING SYSTEM OF WHICH COMPONENTS CAN BE SET AT POWER SAVING MODE INDIVIDUALLY

(75) Inventor: Shigeru Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 993 days.

(21) Appl. No.: 10/145,508

(22) Filed: May 13, 2002

(65) Prior Publication Data

US 2002/0171861 A1    Nov. 21, 2002

(30) Foreign Application Priority Data

May 17, 2001    (JP)    ............... 2001-148215

(51) Int. Cl.
*G06F 15/00*    (2006.01)
(52) U.S. Cl. .................................. 358/1.14
(58) Field of Classification Search .............. 358/1.15, 358/1.1, 1.16, 1.14; 399/9, 328; 713/323, 713/300; 709/223–224; 700/12–13, 17; 347/12–14, 19; 714/47; 400/6, 76
See application file for complete search history.

(56) References Cited

U.S. PATENT DOCUMENTS

2005/0179935 A1 * 8/2005 Ogura et al. ............ 358/1.14

FOREIGN PATENT DOCUMENTS

| JP | 200035732 | 2/2000 |
|---|---|---|
| JP | 200118486 | 1/2001 |

OTHER PUBLICATIONS

U.S. Appl. No. 09/809,075, filed on Mar. 16, 2001.
U.S. Appl. No. 09/963,644, filed on Sep. 27, 2001.

* cited by examiner

*Primary Examiner*—King Y. Poon
*Assistant Examiner*—Saeid Ebrahimi-Dehkordy
(74) *Attorney, Agent, or Firm*—Cooper & Dunham LLP (57) ABSTRACT

An image forming system including an image forming apparatus and one or more peripheral apparatuses connected to the image forming apparatus, each peripheral apparatus having an independent power saving mode. When a peripheral apparatus does not perform a job or is not operated for a predetermined time period, the peripheral apparatus moves to the power saving mode independently. The peripheral apparatus reverts to a normal operation mode in response to a receipt of a trigger signal generated internally or transmitted by the facsimile apparatus. Since only the peripheral apparatus that is necessary to perform a job reverts to the normal operation mode, the total power consumption of the image forming system is reduced.

7 Claims, 8 Drawing Sheets

IMAGE FORMING SYSTEM OF WHICH COMPONENTS CAN BE SET AT POWER SAVING MODE INDIVIDUALLY

BACKGROUND OF THE INVENTION

1. Field of the Invention

The present invention relates to an image forming system, and more particularly, to an image forming apparatus and peripheral apparatuses thereof, each having a power saving function, such as a digital multi-function system and a facsimile communication system.

2. Description of the Related Art

An image forming system that, when it is turned on but left not operated for a predetermined time period, automatically stops supplying electric power to a high-power consuming component or turns off the entire system is publicly known in the related art. Such an image forming system moves, when it remains not operated for a predetermined time period after a previous operation, to a power saving mode where the temperature of a fixing unit is lowered and/or the operation of units other than a control unit is suspended, for example. The image forming system returns to a normal operation mode by a certain trigger mechanism activated in response to a request to operate.

For example, an image forming apparatus disclosed in the Japanese laid-open patent application No. 2000-035732 can turn off a printer control unit while being set at a power saving mode, and resume operating in response to a reversion trigger signal sent by a remote host computer through a communication channel provided for a logging function that enables the image forming apparatus to exchange data with the remote host computer. In the case of this image forming apparatus, however, the remote host computer has to send the reversion trigger signal to output an image every time. The image forming apparatus becomes complicated since the logging function must be implemented in the image forming apparatus.

The Japanese laid-open patent application No. 2001-018486 discloses an image forming system that reduces the standby power consumption of a control unit by controlling the power supply with a printer controller. Such an image forming system, however, cannot reduce its power consumption sufficiently because the printer controller itself does not move to the power saving mode.

In the case of the image forming apparatus and/or the image forming system according to the related art, a specific control unit monitors the reversion trigger signal and sets the entire apparatus and/or system at the normal operation mode in response to the detection of the reversion trigger signal. Because a portion that does not necessarily need to be turned on is turned on, the power consumption of the apparatus and/or system is not reduced enough.

SUMMARY OF THE INVENTION

Accordingly, it is a general object of the present invention to provide a novel and useful image forming system in which one or more of the problems described above are eliminated.

Another and more specific object of the present invention is to provide an image forming system consisting of an image forming apparatus and peripheral apparatuses thereof that can reduce power consumption in a power saving mode and, even in a normal operation mode, control the power consumption.

To achieve the above object, an image forming system, according to the present invention, includes an image forming apparatus having a system control unit that sets said image forming apparatus at a first power saving mode and a peripheral apparatus, wherein said peripheral apparatus comprises a control unit that sets said peripheral apparatus at a second power saving mode.

Since the peripheral apparatus of the image forming system is set at the second power saving mode when the peripheral apparatus is not in use even if the image forming apparatus is operated, the power consumption of the image forming system is reduced compared to an image forming system of the related art.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention will be described below by reference to drawings.

Figure 1:
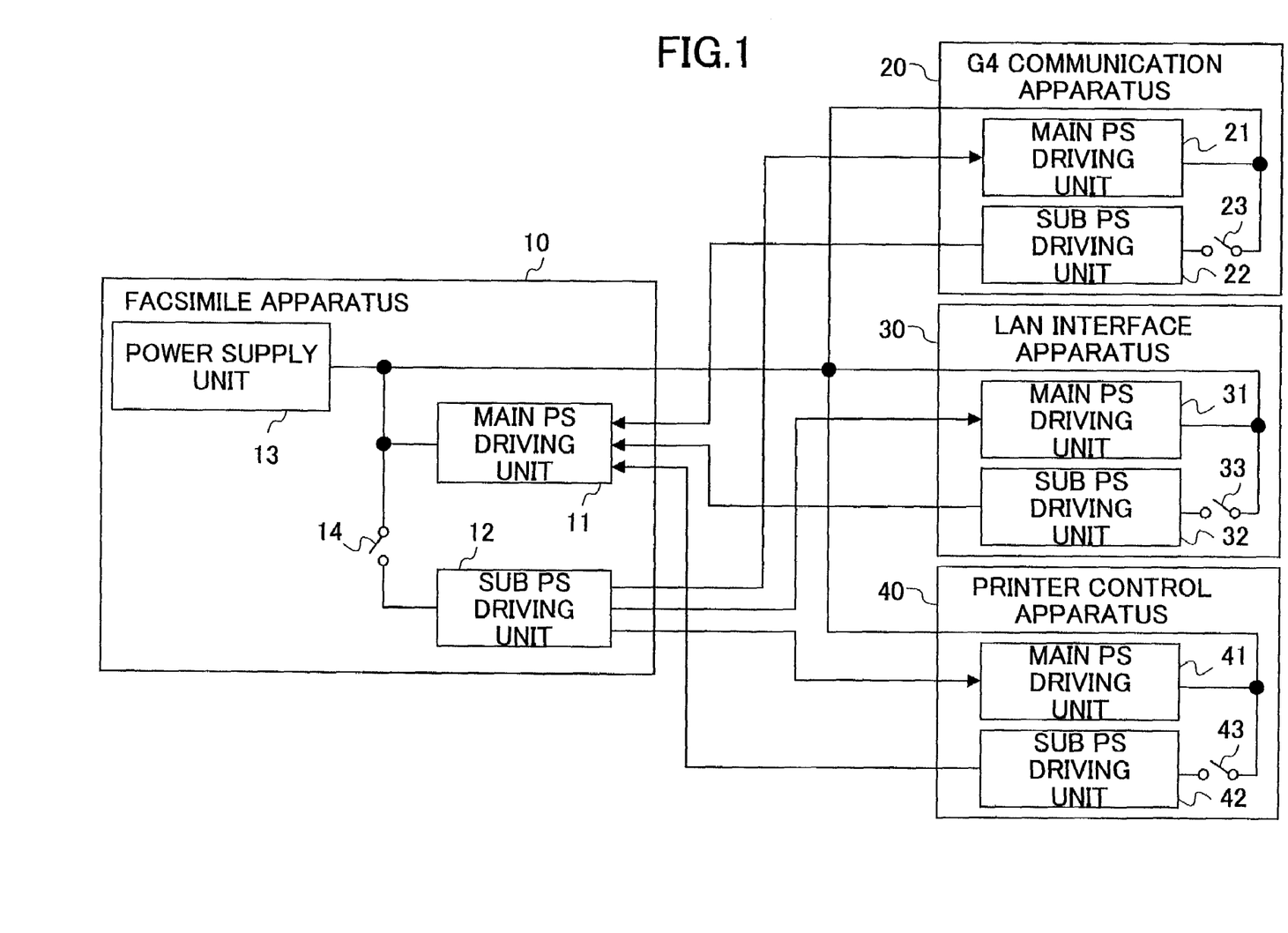
FIG. 1 is a block diagram showing the structure of power supplies provided in a facsimile communication system as an embodiment of the present invention.
Figure 2:
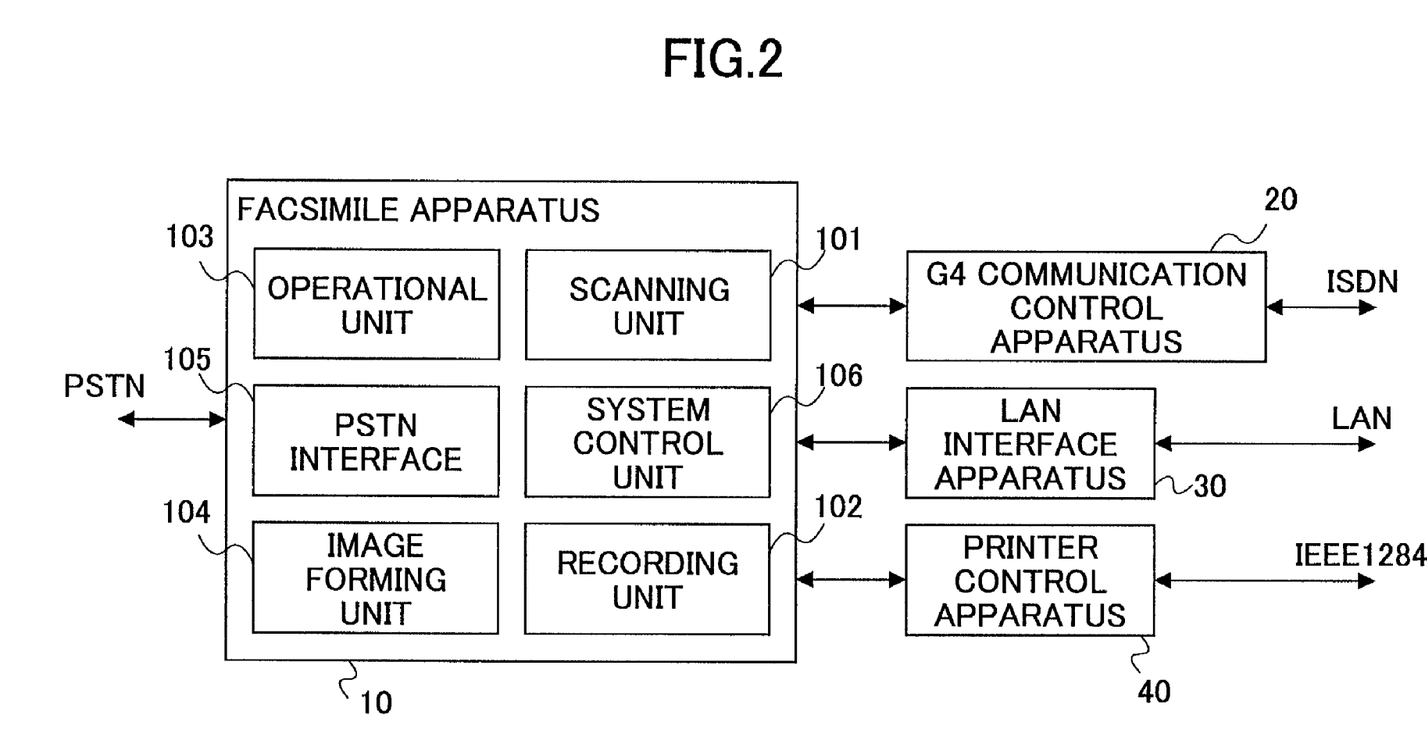
FIG. 2 is a block diagram showing the entire structure of the facsimile communication system as an embodiment of the present invention.
Figure 3:
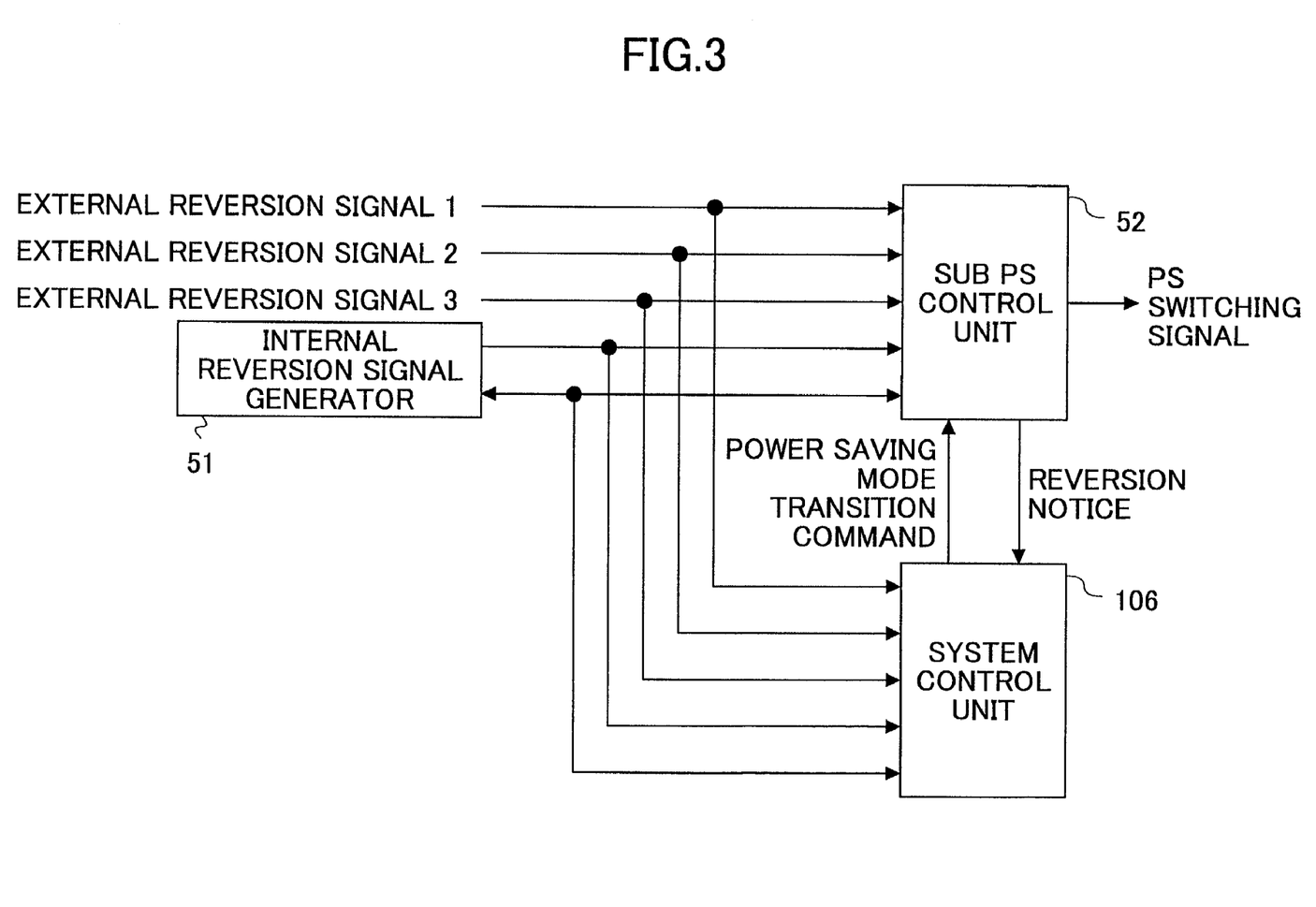
FIG. 3 is a block diagram showing a structure of a main power supply driving unit provided in a facsimile apparatus as an embodiment of the present invention.
Figure 4:
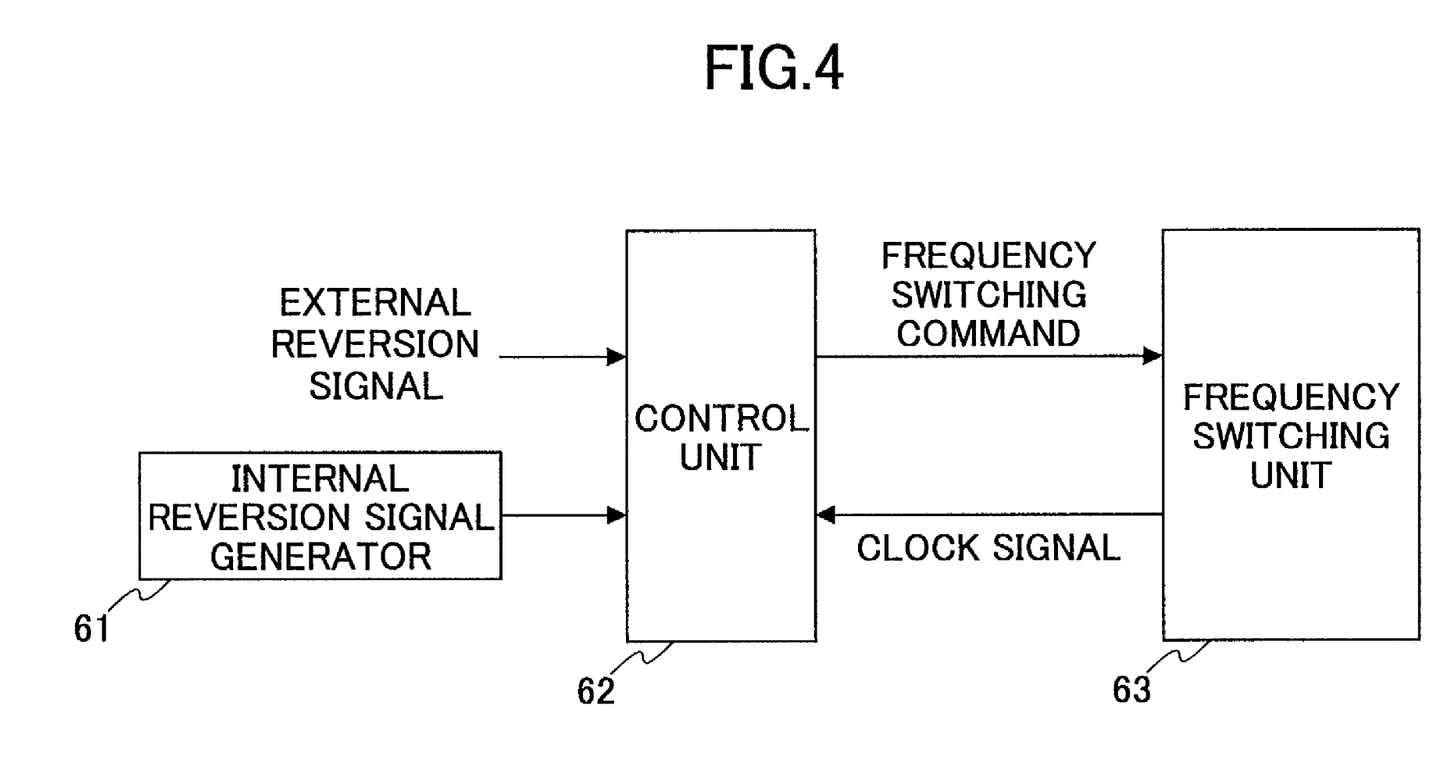
FIG. 4 is a block diagram showing the structure of another main power supply driving unit provided in a peripheral apparatus as an embodiment of the present invention.

A facsimile communication system as an embodiment of the present invention will be described by reference to FIGS. 1 through 4. FIG. 1 is a block diagram showing the structure of power supplies provided in the facsimile communication system. FIG. 2 is a block diagram showing the entire structure of the facsimile communication system. FIG. 3 is a block diagram showing the structure of a main power supply driving unit provided in a facsimile apparatus. FIG. 4 is a block diagram showing the structure of another main power supply driving unit provided in a peripheral apparatus.

As showed in FIG. 2, this facsimile communication system is structured by the facsimile apparatus 10 and the peripheral apparatuses: a G4 communication control apparatus 20, a LAN interface apparatus 30, and a printer control apparatus 40. The facsimile communication system stores data received through PSTN (telephone network), ISDN (integrated services digital network), LAN (local area network), and IEEE 1284, for example, in a recording unit 102 provided in the facsimile apparatus 10, and/or outputs the received data by forming an image by an image forming unit 104. The facsimile communication system also transmits an image read by a scanning unit 101 to an exterior through the above communication channels, and/or outputs (photocopying) the image using the image forming unit 104.

The facsimile apparatus 10 is provided with the scanning unit 101, the recording unit 102, an operational unit 103, the image forming unit 104, a PSTN interface 105, and a system control unit 106. The facsimile apparatus 10 performs G3 facsimile communication through a telephone line. Besides the components mentioned above, the facsimile apparatus 10 is provided with power supplies of which descriptions will be given later.

The scanning unit 101 is a scanner unit that scans an image and converts the image into image data. The recording unit 102 is a storage apparatus such as a hard disk drive that stores data received through the communication channels and image data scanned by the scanning unit 101.

The operational unit 103 is provided with a touch panel or various buttons by which a user operates and sets up the facsimile apparatus 10. The operational unit 103 is further provided with a display unit that displays the operational state and the setup state of the facsimile apparatus 10.

The image forming unit 104 outputs the data received through the various communication channels and the image data scanned by the scanning unit 101, as an image. The image forming unit 104 is, for example, a laser beam type image forming unit.

The PSTN interface 105 is an interface to control the G3 facsimile communication through a telephone line.

The system control unit 106 controls the facsimile apparatus 10 and the entire facsimile communication system. The system control unit 106 is structured by a CPU, ROM, and RAM.

The facsimile apparatus 10 and the peripheral apparatuses are connected to a common bus and exchange control information and image information through the bus.

The G4 communication control apparatus 20 is one of the peripheral apparatuses connected to the facsimile apparatus 10, and controls a G4 facsimile communication through an ISDN channel. In the case of the G4 facsimile communication, the facsimile communication system transmits data scanned by the scanning unit 101, or stores data received from an exterior in the recording unit 102.

The LAN interface apparatus 30 is also one of the peripheral apparatuses connected to the facsimile apparatus 10 and controls a LAN communication through the local area network. The facsimile communication system is connected to a mail server (not shown) through the LAN. When the facsimile communication system sends data using an e-mail, the LAN interface apparatus 30 converts facsimile data transmitted by the facsimile apparatus 10 into an e-mail, and transmits the e-mail to the mail server. When the facsimile communication system receives data using an e-mail, the LAN interface apparatus 30 communicates with the mail server to check whether the mail server has received an e-mail addressed to the facsimile communication system. If the mail server has received an e-mail addressed to the facsimile communication system, the LAN interface apparatus 30 receives the e-mail and transfers data into which the e-mail is converted by the LAN interface apparatus 30 to the recording unit 102 of the facsimile apparatus 10. In the case where the facsimile communication system receives an e-mail from the mail server or a PC (personal computer) connected to the LAN, the LAN interface apparatus 30 receives the e-mail and transmits data into which the e-mail is converted to the recording unit 102 of the facsimile apparatus 10.

The printer control apparatus 40 is also one of the peripheral apparatuses connected to the facsimile apparatus 10. The printer control apparatus 40 is further connected to the host computer (not shown) through an IEEE 1284 communication interface and converts, in response to a command of the host computer to output an image, data received from the host computer into data that the facsimile apparatus 10 can output. The data are stored in the recording unit 102.

The electric power required to operate this facsimile communication system is provided by a power supply unit 13 in the facsimile apparatus 10 showed in FIG. 1.

As shown in FIG. 1, all functional components provided in the facsimile apparatus 10 are divided into a main power supply (PS) driving unit 11 and a sub power supply (PS) driving unit 12. Electric power is supplied to the main PS driving unit 11 even when the facsimile apparatus moves to the power saving mode, while no electric power is supplied to the sub PS driving unit 12 when the facsimile apparatus 10 is in the power saving mode. The system control unit 106 is included in the main PS driving unit 11 and the other units provided in the facsimile apparatus, such as the scanning unit 101 are included in the sub PS driving unit 12.

The main PS driving unit 11 controls a switch 14 and, when the facsimile apparatus 10 does not operate or is not operated for a predetermined time period, sets the facsimile apparatus 10 at the power saving mode by turning off the switch 14 to stop the supply of electric power to the sub PS driving unit 12, that is, the functional units other than the system control unit 106.

The power supply unit 13 supplies electric power all the time to each peripheral apparatus that is not controlled by the main PS driving unit 11.

The peripheral apparatuses, that is, the G4 communication apparatus 20, the LAN interface apparatus 30, and the printer control apparatus 40, are also provided with main PS driving units 21, 31, and 41, sub PS driving units 22, 32, and 42, and switches 23, 33, and 43, respectively. The main PS driving unit 21, for example, controls the switch 23 and sets the corresponding peripheral apparatus, the G4 communication apparatus 20 in this case, at the power saving mode by turning off the switch 23 if the corresponding peripheral apparatus does not operate or is not operated for a predetermined time period. The sub PS driving unit 22, for example, includes functional units other than a control unit provided in the corresponding peripheral apparatus, the G4 communication apparatus 20 in this case.

The power supply unit 13 provides each peripheral apparatus with electric power all the time. When the switches 23, 33, 43 are off, however, the electric power is supplied to only the main PS driving unit 21, 31, and 41, which substantially lowers the power consumption of the peripheral apparatuses.

The sub PS driving unit 12 of the facsimile apparatus 10 is connected to each sub PS driving unit 21, 31, and 41 of the respective peripheral apparatuses and sends a signal, to the main PS driving unit 21, 31, or 41, that causes the main PS driving unit 21, 31, or 41 to revert the corresponding peripheral apparatus to the normal operation mode from the power saving mode. In response to the signal sent by the sub PS driving unit 12, the main PS driving unit 21, 31, or 41 reverts the corresponding peripheral apparatus to the normal operation mode from the power saving mode by turning on the corresponding switch 23, 33, or 43. It is possible to identify one of the peripheral apparatuses and send the reversion signal to the main PS driving unit of the identified peripheral apparatus. The peripheral apparatuses can be reverted to the normal operation mode individually.

Each sub PS driving unit 22, 32, or 42 of the peripheral apparatuses sends a signal, to the main PS driving unit 11 of the facsimile apparatus 10, which causes the main PS driving unit 11 to revert the facsimile apparatus 10 to the normal operation mode from the power saving mode. In response to the reversion signal by each sub PS driving unit 22, 32, or 42, the main PS driving unit 11 reverts the facsimile apparatus 10 from the power saving mode to the normal operation mode by turning on the switch 14.

The structure of the main PS driving unit 11 of the facsimile apparatus 10 is further described below.

As shown in FIG. 3, the main PS driving unit 11 includes an internal reversion signal generator 51, a sub PS control unit 52, and the system control unit 106.

The internal reversion signal generator 51 transmits a reversion signal to the sub PS control unit 52 in response to the detection of a reversion trigger generated in the interior of the facsimile apparatus 10. The reversion trigger is generated at the occurrence of the setting of a document for photocopying and/or transmitting, the detection of ringing that is a receipt of a call through a telephone line, the coming of the appointed time to transmit image data, and the operation of the operational unit 103 by an operator, for example. The reversion trigger is detected by the system control unit 106.

The sub PS control unit 52 is a circuit to turn on or off the switch 14 by sending a PS switching signal. In response to a receipt of a command to set the facsimile apparatus 10 at the power saving mode, the sub PS control unit 52 turns off the switch 14 to set the facsimile apparatus 10 at the power saving mode. In response to receipt of a reversion signal (internal reversion signal) from the internal reversion signal generator 51 or a reversion signal (external reversion signal) from the peripheral apparatuses, the sub PS control unit 52 turns on the switch 14 to revert the facsimile apparatus 10 to the normal operation mode and sends a reversion notice to inform the system control unit 106 that the facsimile apparatus 10 is reverted.

Each peripheral apparatus has a main PS driving unit 21, 31, or 41 of substantially the same structure except that the system control unit 106 is replaced by the corresponding control unit and only one external reversion signal input from the sub PS driving unit 12 of the facsimile apparatus 10.

Instead of the main PS driving unit described above by reference to FIGS. 1 and 3, the structure showed in FIG. 4 is also usable as a main PS driving unit of the peripheral apparatuses.

The main PS driving unit of this structure controls the power consumption by controlling the driving clock frequency of the peripheral apparatuses, instead of turning on and off a switch. This main PS driving unit includes an internal reversion signal generator 61, a control unit 62, and a frequency switching unit 63. In response to a detection of a reversion trigger generated in the interior of the peripheral apparatuses, the internal reversion signal generator 61 sends a reversion signal to the control unit 62.

The control unit 62 is the control unit of the peripheral apparatuses that operates in synchronization to the clock signal provided by the frequency switching unit 63. The control unit 62, when the peripheral apparatus does not operate or is not operated for a predetermined time period, sends a frequency switching command to lower the clock frequency and set the peripheral apparatus at the power saving mode in which the power consumption of the peripheral apparatus is reduced.

In response to a receipt of the reversion signal (internal reversion signal) from the internal reversion signal generator 61 or the reversion signal (external reversion signal) from the facsimile apparatus 10, the control unit 62 sends a frequency switching command to the frequency switching unit 63 to switch the clock frequency to the normal frequency and reverts the peripheral apparatus to the normal operation mode.

The system control unit 106 described above is included in the main PS driving unit 11 in this case. It is possible, however, to include the portion of the system control unit 106 that is not connected to the function to control the power supply and to detect the reversion trigger, in the sub PS driving unit 12.

In the case of the facsimile communication system described above, each peripheral apparatus can be set at a power saving mode to reduce the power consumption of the peripheral apparatus. At the same time, the facsimile apparatus and each peripheral apparatus can revert each other to a normal operation mode. Accordingly, the peripheral apparatuses can share the responsibility to detect the reversion trigger connected to the respective peripheral apparatuses and reduce the responsibility of the facsimile apparatus.

Figure 5:
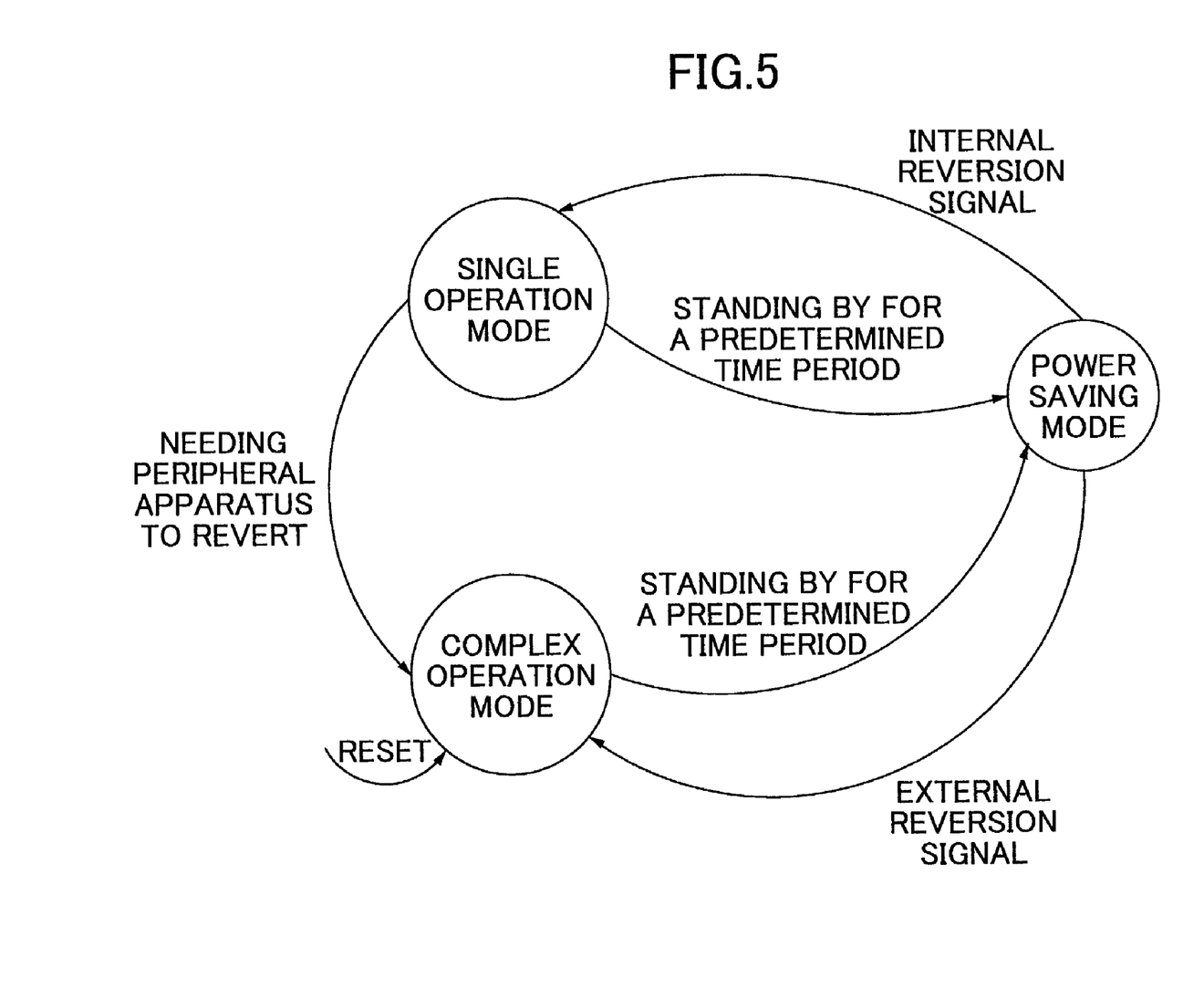
FIG. 5 is a schematic diagram showing the state transition of the facsimile apparatus as an embodiment of the present invention.
Figure 6:
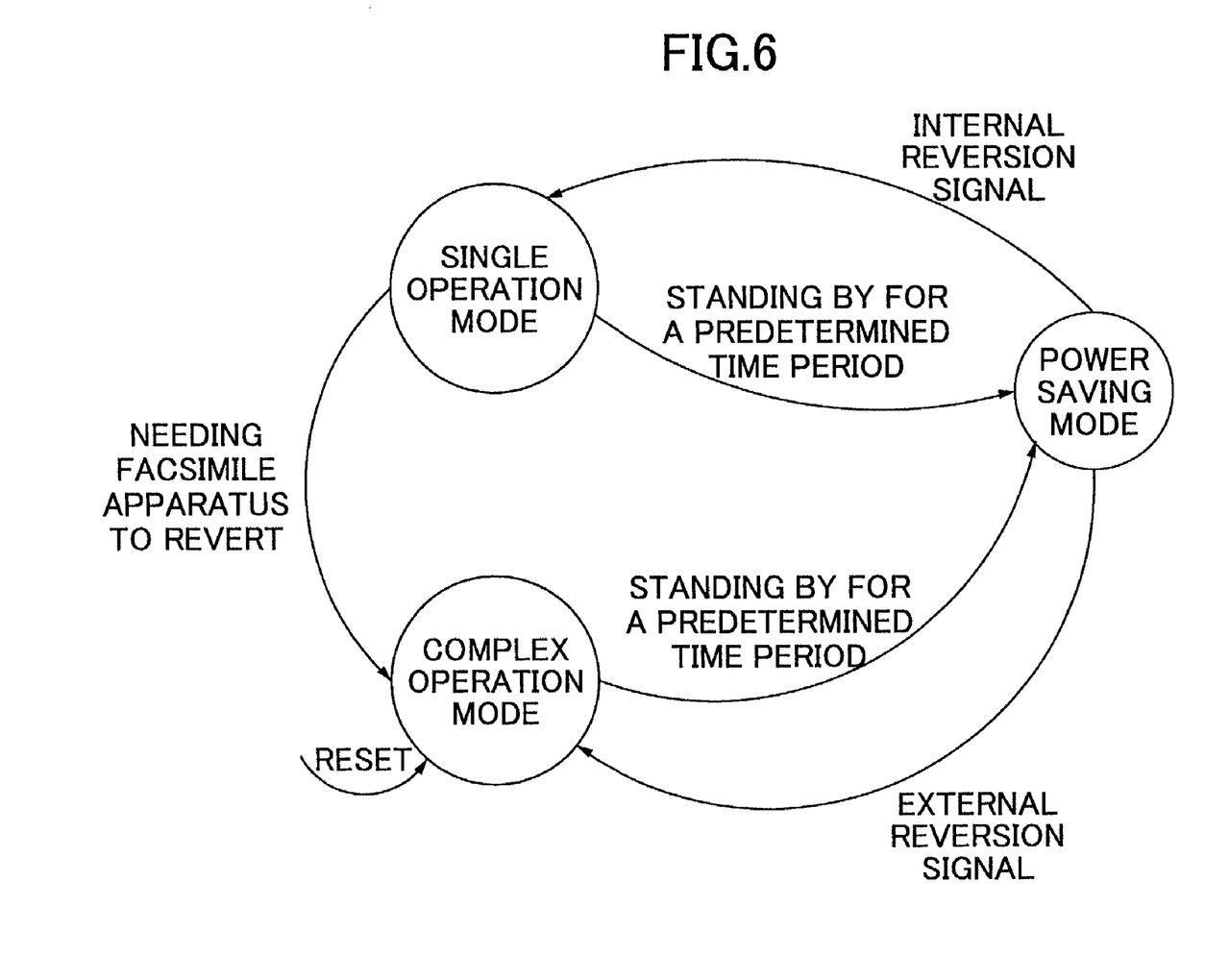
FIG. 6 is a schematic diagram showing the state transition of the peripheral apparatus as an embodiment of the present invention.
Figure 7:
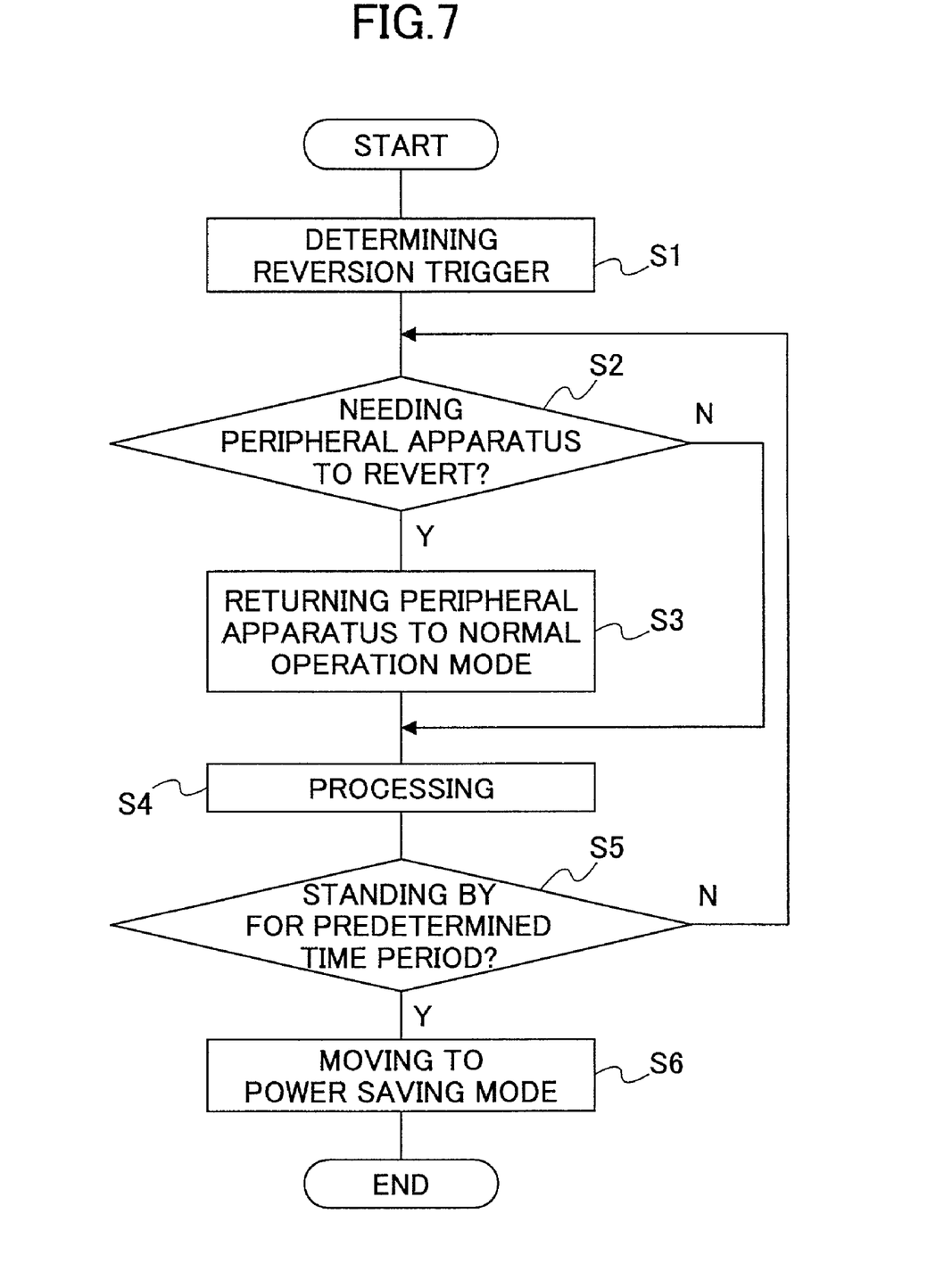
FIG. 7 is a flow diagram showing the operation of the facsimile communication apparatus reverted to a normal operation mode as an embodiment of the present invention.
Figure 8:
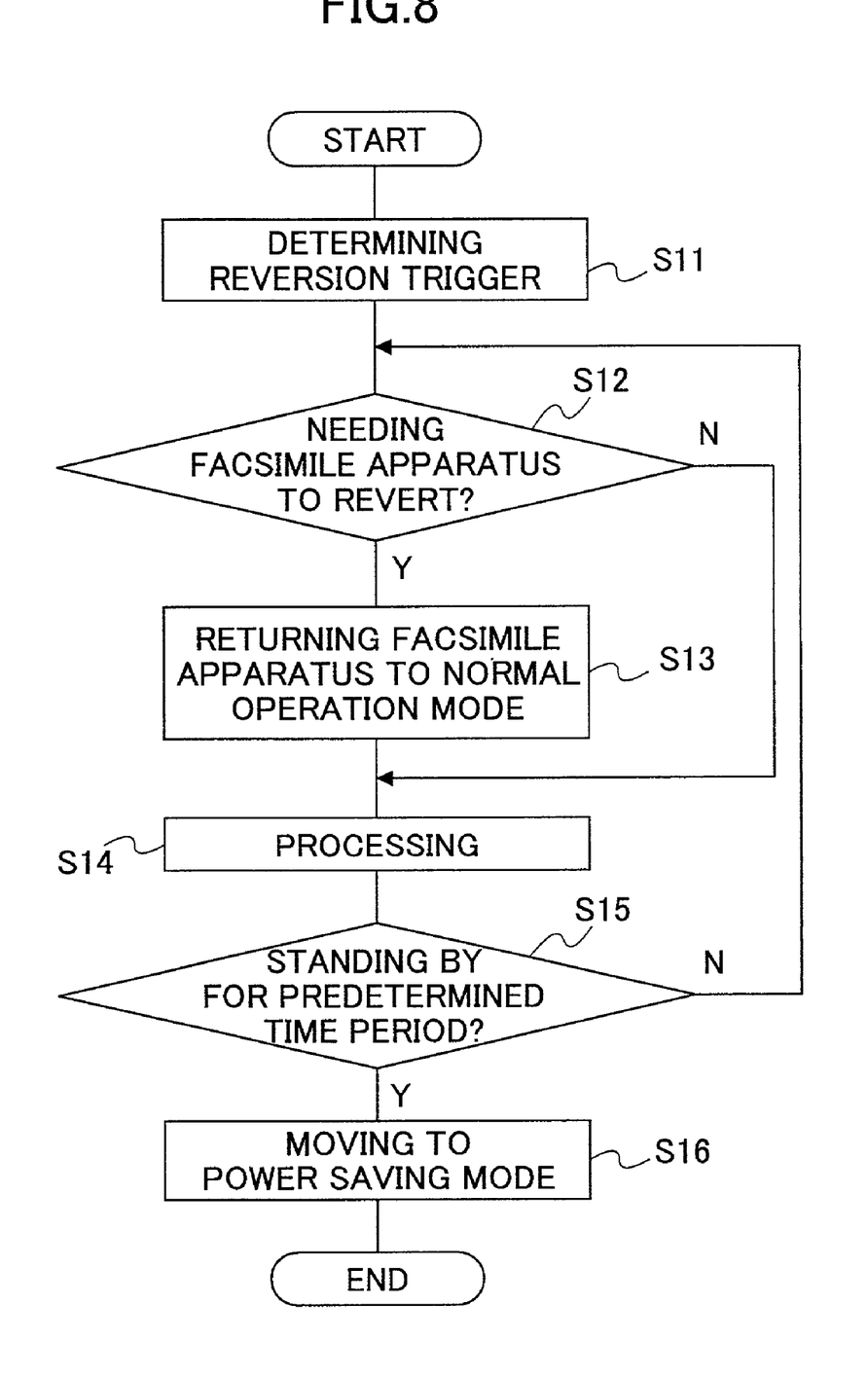
FIG. 8 is a flow diagram showing the operation of the peripheral apparatus reverted to a normal operation mode as an embodiment of the present invention.

The operation of the facsimile communication system as an embodiment of the present invention is further described by reference to FIGS. 5 through 8. FIG. 5 is a schematic diagram showing the state transition of the facsimile apparatus. FIG. 6 is a schematic diagram showing the state transition of the peripheral apparatuses. FIG. 7 is a flow diagram showing the operation of the facsimile apparatus when the facsimile apparatus is reverted to the normal operation mode. FIG. 8 is a flow diagram showing the operation of the peripheral apparatuses when the peripheral apparatuses are reverted to the normal operation mode.

As showed in FIG. 5, the facsimile apparatus 10 moves to a complex operation mode when the facsimile apparatus is reset and/or switched on. In this mode, the facsimile apparatus 10 and one or more peripheral apparatuses (not necessarily all) operate together. If the facsimile apparatus 10 and the peripheral apparatuses do not operate or are not operated for a predetermined time period, the main PS driving unit 11 turns off the switch 14 to set the facsimile apparatus 10 to the power saving mode. In the case where the facsimile apparatus 10 is reverted to the normal operation mode from the power saving mode in response to the receipt of an external reversion signal, the facsimile apparatus 10 moves to the complex operation mode.

In the case that the facsimile apparatus 10 is reverted to the normal operation mode from the power saving mode in response to the receipt of an internal reversion signal, the facsimile apparatus 10 moves to a single operation mode. In the single operation mode, the facsimile apparatus 10 operates alone. If a peripheral apparatus needs to be operated while the facsimile apparatus 10 is operated in the single operation mode, the facsimile apparatus 10 sends a reversion signal to the peripheral apparatus to revert the peripheral apparatus to the normal operation mode, and moves to the complex operation mode. In the case that the operation finishes without reverting the peripheral apparatus to the normal operation mode and the facsimile apparatus 10 does not operate or is not operated for a predetermined time period, the facsimile apparatus 10 moves to the power saving mode without moving to the complex operation mode.

On the other hand, as showed in FIG. 6, if a peripheral apparatus is reset, the peripheral apparatus also moves to the complex operation mode. If the peripheral apparatus does not operate or is not operated for a predetermined time period, the main PS driving unit of the peripheral apparatus sets the peripheral apparatus at the power saving mode. If the peripheral apparatus is reverted to the normal operation mode from the power saving mode in response to an external reversion signal, the peripheral apparatus moves to the complex operation mode.

In the case that the peripheral apparatus is reverted to the normal operation mode in response to the receipt of an internal reversion signal, the peripheral apparatus moves to a single operation mode. In this mode, the peripheral apparatus operates alone. If the facsimile apparatus 10 needs to be operated while the peripheral apparatus is in this single operation mode, the peripheral apparatus sends a reversion signal to the facsimile apparatus 10 to revert the facsimile apparatus 10 to the normal operation mode, and moves to the complex operation mode. In the case that the peripheral apparatus finishes its operation without the necessity of returning the facsimile apparatus 10 to the normal operation mode, and the peripheral apparatus does not operate or is not operated for a predetermined time period, the peripheral apparatus moves to the power saving mode without moving to the complex operation mode.

The operation of the facsimile apparatus 10 upon reverting to the normal operation mode will be described next.

The facsimile apparatus 10 begins the operation showed in FIG. 7 when the facsimile apparatus 10 reverts to the normal operation mode.

The facsimile apparatus 10 first determines what job or operation the reversion trigger that has caused the facsimile apparatus 10 to revert to the normal operation mode is (step S1). The facsimile apparatus 10 further determines whether one or more peripheral apparatuses need to revert to the normal operation mode in order to perform the job or operation (step S2). If no peripheral apparatus needs to revert, step S4 is performed. If one or more peripheral apparatuses need to revert, the facsimile apparatus 10 sends a reversion signal to the peripheral apparatuses that are necessary to revert in order to set the peripheral apparatuses at the normal operation mode (step S3). Then, step S4 is performed.

In the case of photocopying and/or transmission at an appointed time through a telephone line, for example, no peripheral apparatus needs to revert to the normal operation mode because the facsimile apparatus can perform the job and operation independently. In the case of G4 facsimile transmission and/or the transmitting of an e-mail, for example, one or more peripheral apparatuses need to revert to the normal operation mode.

The job or operation is performed (step S4). After finishing the job or operation, the facsimile apparatus 10 determines whether the facsimile apparatus 10 does not operate or is not operated for a predetermined time period continuously (step S5). If the facsimile apparatus 10 is to perform a job or is operated during the predetermined time period, step S2 and the following steps are performed. If the facsimile apparatus 10 does not perform any job or is not operated for the predetermined time period, the facsimile apparatus 10 moves to the power saving mode (step S6). The operation of the facsimile apparatus 10 ends.

Each peripheral apparatus begins the operation showed in FIG. 8 when the peripheral apparatus reverts to the normal operation mode.

The peripheral apparatus determines what job or command the trigger that caused the peripheral apparatus to revert to the normal operation mode is (step S11). The peripheral apparatus determines whether the facsimile apparatus 10 needs to be turned to the normal operation mode in order to perform the job (step S12). If the facsimile apparatus 10 does not need to revert to the normal operation mode, step S13 is skipped and step S14 is performed. If the facsimile apparatus 10 needs to be turned to the normal operation mode, the peripheral apparatus sends a reversion signal to the facsimile apparatus 10 to make the facsimile apparatus 10 revert to the normal operation mode (step S13). Then, step S14 is performed.

The case where the facsimile apparatus 10 does not need to revert is such a case that the LAN interface apparatus 30 reverts in response to an internal reversion signal generated by a timer to fetch e-mails addressed to the facsimile communication system, but no e-mail has arrived at the mail server, for example. The case where the facsimile apparatus 10 needs to revert is the case in which the recording unit 102 is used such as the G4 facsimile receiving, the arriving of e-mails, and the receiving of a command to form an image, for example.

The job is performed (step S14). The peripheral apparatus determines whether the peripheral apparatus is continuously in a standby state in which no operation or no command is performed for a predetermined time period (step S15). If the peripheral apparatus is interrupted, step S12 and steps following step S12 are performed. If the predetermined time period passes without an interruption, the peripheral apparatus moves to the power saving mode (step S16).

While the facsimile apparatus 10 and the peripheral apparatuses are all in the power saving mode, only the apparatus that is necessary to perform a job is selectively turned to the normal operation mode by performing the operation as described above. Accordingly, the power consumption that is wasted by the apparatus that is not necessary to perform the job is reduced.

The facsimile communication system is described as an embodiment of the present invention. The present invention, however, is not limited to the facsimile communication system but is applicable to other image forming apparatuses such as a digital complex system having a combined function of a photocopier and a printer. All peripheral apparatuses described above are a communication interface. But the peripheral apparatus is not limited to a communication interface, and the present invention is applicable to any peripheral apparatus as long as the peripheral apparatus has an independent control unit. The number of the peripheral apparatus is also not limited to three.

The image forming system described above as an embodiment of the present invention consumes less power than an image forming system of the related art since each peripheral apparatus can move independently to the power saving mode.

Because the image forming apparatus is provided with a peripheral reversion unit (sub PS driving unit) that turns the peripheral apparatuses from the power saving mode to the normal operation mode and the peripheral apparatuses are provided with an image forming reversion unit (sub PS driving unit) that turns the image forming apparatus from the power saving mode to the normal operation mode, the responsibility to detect a reversion trigger is not concentrated on the facsimile apparatus but distributed to each peripheral apparatus. If the facsimile apparatus and all peripheral apparatuses are set in the power saving mode, only the apparatus that is necessary to operate can selectively revert to the normal operation mode. Accordingly, the image forming system can reduce its power consumption wasted by the apparatus that is not necessary to operate.

The preferred embodiments of the present invention are described above. The present invention is not limited to these embodiments, but various variations and modifications may be made without departing from the scope of the present invention.

This patent application is based on Japanese priority patent application No. 2001-148215 filed on May 17, 2001, the entire contents of which are hereby incorporated by reference.

What is claimed is:

1. An image forming system including an image forming apparatus having a system control unit that sets said image forming apparatus at a first power saving mode and a peripheral apparatus,
   wherein said peripheral apparatus comprises a control unit that sets said peripheral apparatus at a second power saving mode;
   said image forming apparatus comprises a power supply unit that continuously provides an electric power supply to said peripheral apparatus independently from a control of said system control unit; and
   said control unit of said peripheral apparatus is provided with the electric power supply by said power supply unit of said image forming apparatus and controls a power consumption of said peripheral apparatus by controlling a clock frequency in synchronization to which said peripheral apparatus operates.

2. The image forming system as claimed in claim 1, wherein said image forming apparatus comprises a peripheral reversion unit that turns said peripheral apparatus from said second power saving mode to a second normal operation mode.

3. The image forming system as claimed in claim 2, wherein
   said peripheral reversion unit, if a plurality of peripheral apparatuses are included in said image forming system, selectively turns only the peripheral apparatuses that are necessary to perform a job from said second power saving mode to said second normal operation mode.

4. The image forming system as claimed in claim 1, wherein said peripheral apparatus further comprises an image forming reversion unit that turns said image forming apparatus from said first power saving mode to a first normal operation mode.

5. The image forming system of claim 1, wherein said image forming apparatus comprises a peripheral reversion unit that turns said peripheral apparatus from said second power saving mode to a second normal operation mode.

6. The image forming system of claim 5, wherein if a plurality of peripheral apparatuses are included in said image forming system, said peripheral reversion unit selectively turns only the peripheral apparatuses that are necessary to perform a job from said second power saving mode to said second normal operation mode.

7. The image forming system as claimed in claim 1, wherein said peripheral apparatus further comprises an image forming reversion unit that turns said image forming apparatus from said first power saving mode to a first normal operation mode.

* * * * *